United States Patent Office 2,878,164
Patented Mar. 17, 1959

2,878,164
CONCENTRATION OF GAMMA BENZENE HEXACHLORIDE BY DISTILLATION

Oscar H. Johnson, South Charleston, W. Va., assignor to Food Machinery and Chemical Corporation, New York, N. Y., a corporation of Delaware No Drawing. Application May 13, 1952
Serial No. 287,629

10 Claims. (Cl. 202—39.5)

This invention relates to a process for obtaining a gamma-rich product from technical benzene hexachloride.

It is known that the principal pesticidal toxicant of benzene hexachloride (BHC), more properly hexachlorocyclohexane, is its gamma isomer. It has also been discovered in the use of technical benzene hexachloride that some of the isomers which are relatively inert to pests, such as insects and the like, impair the taste of food products or are substantially more toxic to plants than the gamma isomer.

Several procedures have been suggested for obtaining a concentrated gamma product or a technical benzene hexachloride which is richer in its gamma isomer content. One of the methods has involved extraction with a selective solvent. In this way, a technical benzene hexachloride can be obtained which is substantially enriched in its gamma isomer content. It has been found, however, that substantially less than one half of the gamma isomer content of the technical benzene hexachloride can be recovered in this concentrated state.

It is an object of this invention to obtain a more potent pesticide or a gamma-rich product from technical benzene hexachloride.

Another object of this invention is to obtain a benzene hexachloride which has higher toxicity for pests and less of a tendency to impart undesirable taste to edible products.

It is a further object of this invention to obtain benzene hexachloride of improved color.

A still further object of this invention is to recover a major portion of the gamma isomer content of benzene hexachloride in a more concentrated form.

Other objects of the invention will be apparent from the more detailed description which follows.

These and other objects of the invention are obtained by dissolving technical benzene hexachloride in a solvent having a boiling point near that of its gamma isomer content, subjecting the solution to distillation temperatures under reduced pressure until most of the alpha and gamma isomers are codistilled with the solvent and separating the distillate into an alpha isomer enriched fraction and a gamma isomer enriched fraction. Although the present invention may be practiced with simple distillation apparatus, it has been found that substantially superior separation of the alpha and gamma isomer of benzene hexachloride can be achieved under fractional distillation.

Suitable solvents having boiling points near the boiling point of the gamma isomer of benzene hexachloride include preferably polyhydric alcohols, advantageously triethylene glycol, although other polyhydric alcohols such as ethylene glycol, glycerol, diethylene glycol, tripropylene glycol and their ethers, such as tetraethylene glycol diethyl ether may also be used. The isomers of benzene hexachloride can be separated from such polyhydric alcohols merely by adding water, or a partial separation can be achieved first by cooling and the separation later completed by the addition of water. When such polyhydric alcohols are cooled at room temperature, the alpha isomer is primarily precipitated and, upon filtration, a filtrate is obtained substantially enriched in its gamma isomer content. In this manner, the gamma isomer content of the precipitate formed upon the addition of water can be materially increased.

Hydrocarbons having a boiling point near the boiling point of the gamma isomer of benzene hexachloride may also be used. These solvents have the advantage that the benzene hexachloride isomers can be separated merely by cooling and the solvents then reused in the process. Typically, a petroleum fraction having a boiling point of about 300° C. could be used as a hydrocarbon solvent.

Generally speaking, as stated, the solvents should have a boiling point near that of the gamma isomer of the benzene hexachloride but they should not have a boiling point at ordinary pressures substantially exceeding 300° C., for solvents having higher boiling points are difficult to distill without decomposition of the benzene hexachloride. Preferred solvents have boiling points between about 200 and about 300° C. For example, triethylene glycol, which has proven especially advantageous, has a boiling point of about 287° C. at atmospheric pressures. Such solvents and other suitable solvents form solutions of benzene hexachloride distilling at temperatures below 225° C. at 20 mm. pressure. The preferred solvents form a solution distilling at temperatures below 200° C. at 20 mm. pressure. Solvents should be sufficiently high boiling, however, such that most of the alpha and gamma isomers can be distilled out without having a high ratio of solvent to solute. Triethylene glycol has an unusually favorable solvent to solute ratio requiring only about 2 ml. of solvent per gram of solute.

The practice of the present invention can be readily understood from an illustrated embodiment of the invention.

EXAMPLE

Five hundred grams of a technical benzene hexachloride containing 12.6% of the gamma isomer and 68% of the alpha isomer were dissolved in one liter of triethylene glycol and subjected to distillation under reduced pressure through a six foot column packed with one quarter inch helices. During the distillation pot temperatures were maintained at about 190° C., column temperatures at 130 to 145° C., head temperatures at 130 to 150° C., and head pressures at 3 to 6 mm. of mercury. In the table which follows the various fractions contain about 100 cc. of the distillate.

Table

| Fraction | Solid Product | | | | | Percent of Total Isomer Content Recovered | | |
|---|---|---|---|---|---|---|---|---|
| | g. | Percent by IR Analysis | | | | | | |
| | | Alpha | Gamma | Delta | Epsilon | Alpha | Gamma | Delta |
| 1 | 91 | 88 | 2 | 3 | 3 | 23 | 2 | 7 |
| 2 | 107 | 94 | 2 | 1 | 2 | 29 | 4 | 3 |
| 3 | 136 | 86 | 11 | 1 | 1 | 32 | 25 | 4 |
| 4 | 44 | 56 | 39 | 1 | 2 | 7 | 27 | 1 |
| 5 | 12 | 32 | 63 | 1 | 5 | 1 | 12 | |
| 6 | 5 | 28 | 61 | 4 | 8 | <1 | 4 | |
| 7 | 2 | 20 | 64 | 6 | 9 | | 2 | |
| Residue | 62 | 0 | 4 | 50 | 7 | 0 | 5 | 80 |
| Total | 460 | | | | | 93 | 81 | 95 |

The various isomers were recovered from the triethylene glycol distillate by the addition of water. Higher concentrations of the gamma isomer in the distillate could be obtained by first cooling the distillate, say to room temperature, filtering off the precipitate, and then adding water to the filtrate to precipitate the gamma isomer.

However, under the initial cooling, considerable quantities of the gamma isomer crystallize out with the alpha isomer, giving a precipitate relatively weak in gamma content.

A study of the foregoing table makes it apparent that the process of the present invention permits the recovery of alpha and gamma isomers of a technical benzene hexachloride substantially freed of other isomers such as the beta, delta and epsilon isomers. A further study of the foregoing table, particularly fractions 1 and 2, reveals that in excess of 50% of the alpha isomer can be removed with a loss of only 6% of the gamma isomer. The three fractions recovered after the first two fractions contain a rapidly increasing proportion of gamma isomer. If fractions 3 to 7 are combined, the product contains 70% of the total gamma isomer content of the original technical benzene hexachloride and analyzes 22% gamma isomer and 67% alpha isomer. This is almost a doubling of the concentration of the gamma isomer content in comparison to the alpha isomer content. Even fractions 3 to 5 contain a concentrated or gamma enriched benzene hexachloride containing approximately ⅔ of the gamma isomer content of the original technical benzene hexachloride in approximately double its original concentration with negligible quantities of isomers such as beta, delta and epsilon isomers.

A further analysis of the various distillation fractions shows that any fraction beginning with the fifth fraction is enriched to the point where the gamma isomer constitutes the major proportion of the recovered benzene hexachloride. For example, the separate recovery of the fifth fraction would give a fraction which would have twice as much gamma isomer as alpha isomer while still permitting the recovery of 52% of the gamma isomer in a substantially enriched state in fractions 3 and 4, largely freed of objectionable odors. Likewise, fraction 7, although containing a relatively small amount of the total gamma isomer, contains the gamma isomer in more than three times the concentration of the alpha isomer although the separation of delta and epsilon isomers is not as good as in some earlier fractions.

It is apparent from a study of the total gamma isomer recovery shown in the table that a certain decomposition of the gamma isomer has taken place and that a more effective distillation should result in fractions 3 to 7 producing a product containing 89% of the total gamma content of a technical benzene hexachloride and analyzing about 27% of gamma isomer and 64% of alpha isomer. It will be apparent further that any given fraction or combination of fractions can be subjected to repeated fractional distillation, thereby obtaining fractions increasingly enriched in gamma isomer content.

The fractionating apparatus used was found, from data obtained in separating a mixture of benzene and ethylene dichloride, to contain the equivalent of only four theoretical plates. It is apparent, therefore, that a much more efficient separation can be achieved by using a more efficient fractionating column. Instead of a batch separation, a properly balanced rectifying column could be operated so as to continuously produce an alpha-rich fraction on the upper plates of the column and a gamma-rich fraction on the intermediate plates while permitting the higher boiling fractions containing the other isomers to flow from the bottom of the column.

If hydrocarbon solvents having a boiling point near that of the gamma isomer of benzene hexachloride are used in the process of this invention, the process is modified by separating the benzene hexachloride from the various fractions by crystallization through cooling, filtering off the formed crystals, and recirculating the solvent.

For the purpose of this invention, technical benzene hexachloride is to be considered any benzene hexachloride containing a mixtuer of isomers including a substantial amount of the gamma isomer, say 5 to 90%. Ordinarily, technical or commercial benzene hexachloride contains from about 6 to 15% of the gamma isomer. Most technical benzene hexachlorides normally consist primarily of the alpha and gamma isomer fractions.

Certain known technical commercial benzene hexachlorides are enriched with the gamma isomer and oftimes contain 35% or higher of the gamma isomer content. For instance, the commercial fractions numbered 4 to 7 in the process of this invention contain more than 35% of the gamma isomer. Typically, benzene hexachloride containing 12 to 15% of the gamma isomer and 60 to 65% of the alpha isomer and certain gamma enriched technical benzene hexachlorides have been used in the processes of this invention.

It is apparent that any fraction of a technical benzene hexachloride recovered in the process of this invention which is not enriched in its gamma content could still be used as a technical benzene hexachloride as a pesticide where the presence of other isomers is not objectionable, such as in the extensive treatment of cotton crops.

It will be understood that the foregoing description of my invention is illustrative and that various modifications and changes may be made in the illustrative embodiments of the invention without departing from the spirit of the invention or the scope of the appended claims.

What is claimed is:

1. The method of preparing a high gamma isomer fraction from a technical benzene hexachloride which comprises, dissolving a technical benzene hexachloride in an aliphatic organic solvent having a boiling point near that of the gamma isomer of benzene hexachloride selected from the group consisting of polyhydric alcohols having not more than three hydroxyl groups and glycol ethers, subjecting the solution to distillation temperatures under reduced pressures until most of the alpha and gamma isomers are codistilled, and separating the distillate into an alpha isomer enriched fraction and into a gamma isomer enriched fraction.

2. The method of preparing a high gamma isomer fraction from a technical benzene hexachloride which comprises, dissolving a technical benzene hexachloride in a polyhydric alcohol having not more than three hydroxyl groups and having a boiling point near that of the gamma isomer of benzene hexachloride but not substantially exceeding 300° C., subjecting the solution to distillation temperatures under reduced pressures and under reflux conditions to distill out most of the alpha and gamma isomers, separating the distillate into an alpha isomer enriched fraction and into a gamma isomer enriched fraction, and separating a benzene hexachloride enriched in its gamma isomer content from the gamma isomer enriched fraction by the introduction of water.

3. The method of concentrating the gamma isomer fraction of a technical benzene hexachloride which comprises, dissolving a technical benzene hexachloride in a polyethylene glycol having a boiling point not substantially exceeding 300° C., subjecting the solution to distillation temperatures at reduced pressures until most of the alpha and gamma isomers are codistilled with the polyethylene glycol, separating the distillate into an alpha isomer enriched fraction and a gamma isomer enriched fraction, and separating a benzene hexachloride enriched in its gamma isomer from the gamma isomer enriched fraction.

4. The method of preparing a high gamma isomer fraction from a technical benzene hexachloride which comprises, dissolving a technical benzene hexachloride in a polyhydric alcohol having not more than three hydroxyl groups and having a boiling point near that of the gamma isomer of benzene hexachloride but not substantially exceeding 300° C., subjecting the solution to distillation temperatures under reduced pressures to distill out most of the alpha and gamma isomers, separating the distillate into an alpha isomer enriched fraction and into a gamma isomer enriched fraction, cooling the gamma enriched fraction to precipitate out a substantial proportion of its alpha isomer content, filtering off the precipitate, and separating the gamma isomer from the filtrate.

5. The method of preparing a high gamma isomer fraction from a technical benzene hexachloride which comprises, dissolving a technical benzene hexachloride in a solvent having a boiling point near that of the gamma isomer of benzene hexachloride selected from the group consisting of polyhydric alcohols having not more than three hydroxyl groups and glycol ethers, subjecting the solution to distillation temperatures under reduced pressures until most of the alpha and gamma isomers are codistilled, separating the distillate into an alpha isomer enriched fraction and into a gamma isomer enriched fraction, and subjecting the gamma isomer enriched fraction to the aforesaid codistillation and separation.

6. The method of concentrating the gamma isomer fraction of a technical benzene hexachloride which comprises, dissolving a technical benzene hexachloride in triethylene glycol, subjecting the solution to distillation temperatures at reduced pressures until most of the alpha and gamma isomers are codistilled with the triethylene glycol, separating the distillate into an alpha isomer enriched fraction and a gamma isomer enriched fraction, and separating a benzene hexachloride enriched in its gamma isomer from the gamma isomer enriched fraction.

7. A method for treating benzene hexachloride isomer mixtures comprising distilling the isomer mixture in the presence of glycerine, and recovering the benzene hexachloride in a plurality of fractions from said distillation.

8. A method for treating benzene hexachloride isomer mixture containing the gamma and delta isomers comprising distilling the isomer mixture in the presence of glycerine until a major portion of the gamma isomer is distilled from the mixture and interrupting said distillation while a major portion of the delta isomer still remains undistilled, and recovering the gamma isomer fraction separate from the delta isomer fraction.

9. A method for treating benzene hexachloride isomer mixtures comprising distilling the isomer mixture in the presence of triethylene glycol, and recovering the benzene hexachloride in a plurality of fractions from said distillation.

10. A method for treating benzene hexachloride isomer mixture containing the gamma and delta isomers comprising distilling the isomer mixture in the presence of triethylene glycol until a major portion of the gamma isomer is distilled from the mixture and interrupting said distillation while a major portion of the delta isomer still remains undistilled, and recovering the gamma isomer fraction separate from the delta isomer fraction.

References Cited in the file of this patent

UNITED STATES PATENTS

| | | |
|---|---|---|
| 2,438,900 | Cooke et al. | Apr. 6, 1948 |
| 2,486,688 | Thomas et al. | Nov. 1, 1949 |
| 2,502,258 | Hay et al. | Mar. 28, 1950 |
| 2,553,956 | Burrage et al. | May 22, 1951 |
| 2,567,034 | Scovic | Sept. 4, 1951 |
| 2,584,376 | Williams | Feb. 5, 1952 |
| 2,585,898 | Kauer | Feb. 12, 1952 |
| 2,717,233 | Trotter | Sept. 6, 1955 |

FOREIGN PATENTS

| | | |
|---|---|---|
| 573,693 | Great Britain | Dec. 3, 1945 |